(12) United States Patent
Sayag

(10) Patent No.: US 7,359,488 B1
(45) Date of Patent: Apr. 15, 2008

(54) TECHNIQUE FOR DIGITALLY REMOVING X-RAY SCATTER IN A RADIOGRAPH

(75) Inventor: Michel Sayag, 1820 Hackett Ave., Mountain View, CA (US) 94043

(73) Assignee: Michel Sayag, Mountain View, CA (US)

(*) Notice: Subject to any disclaimer, the term of this patent is extended or adjusted under 35 U.S.C. 154(b) by 337 days.

(21) Appl. No.: 11/137,685

(22) Filed: May 24, 2005

Related U.S. Application Data

(60) Provisional application No. 60/574,555, filed on May 25, 2004.

(51) Int. Cl.
G21K 1/10 (2006.01)
G21N 23/087 (2006.01)

(52) U.S. Cl. ........................ 378/154; 378/87

(58) Field of Classification Search ................ 378/62, 378/70, 86, 87, 98.4, 98.12, 140, 147–158, 378/210, 82, 4–20
See application file for complete search history.

(56) References Cited

U.S. PATENT DOCUMENTS

| | | | | |
|---|---|---|---|---|
| 3,882,310 A * | 5/1975 | Barrett | ............ | 378/2 |
| 4,549,307 A | 10/1985 | Macovski | ............ | 378/145 |
| 4,841,555 A | 6/1989 | Doi et al. | ............ | 378/99 |
| 4,969,175 A * | 11/1990 | Nelson et al. | ............ | 378/146 |
| 5,231,652 A * | 7/1993 | Harding | ............ | 378/86 |
| 5,432,349 A * | 7/1995 | Wood et al. | ............ | 250/336.1 |
| 5,468,970 A * | 11/1995 | Kocsis et al. | ............ | 250/505.1 |
| 5,684,851 A * | 11/1997 | Kurbatov et al. | ............ | 378/87 |
| 5,771,269 A * | 6/1998 | Chao | ............ | 378/5 |
| 6,894,281 B2 * | 5/2005 | Such et al. | ............ | 250/367 |
| 6,950,495 B2 * | 9/2005 | Nelson et al. | ............ | 378/87 |
| 6,987,836 B2 * | 1/2006 | Tang et al. | ............ | 378/154 |
| 7,149,284 B2 * | 12/2006 | Ikhlef | ............ | 378/149 |
| 7,209,547 B2 * | 4/2007 | Baier et al. | ............ | 378/149 |
| 2001/0002699 A1 * | 6/2001 | Such et al. | ............ | 250/367 |
| 2002/0097839 A1 * | 7/2002 | Davis | ............ | 378/154 |
| 2002/0150202 A1 * | 10/2002 | Harding et al. | ............ | 378/16 |
| 2003/0089857 A1 * | 5/2003 | Hoheisel et al. | ............ | 250/370.09 |
| 2004/0156479 A1 * | 8/2004 | Hoheisel et al. | ............ | 378/154 |
| 2004/0234036 A1 * | 11/2004 | Klausz | ............ | 378/154 |
| 2005/0123099 A1 * | 6/2005 | Schneider et al. | ............ | 378/154 |
| 2005/0281383 A1 * | 12/2005 | Harding et al. | ............ | 378/149 |

* cited by examiner

*Primary Examiner*—Edward J. Glick
*Assistant Examiner*—Anastasia S. Midkiff
(74) *Attorney, Agent, or Firm*—Beyer Weaver LLP

(57) ABSTRACT

Methods and apparatus for generating an x-ray image. An object is interposed between a detector and an x-ray source. A grid is interposed between the x-ray source and the object. The grid is exposed to primary x-ray energy generated by the x-ray source, thereby exposing the object to a first portion of the primary energy via the interstices of the grid. A second portion of the primary energy is received with first areas of the detector corresponding to the interstices of the grid. Secondary x-ray energy is received with the first areas of the detector and with second areas of the detector corresponding to the elements of the grid. The secondary energy results from scattering of the primary x-ray energy. Image data are generated by altering data from the first areas with reference to data from the second areas.

20 Claims, 9 Drawing Sheets

TECHNIQUE FOR DIGITALLY REMOVING X-RAY SCATTER IN A RADIOGRAPH

RELATED APPLICATION DATA

The present application claims priority under 35 U.S.C. 119(e) to U.S. Provisional Patent Application No. 60/574,555 for TECHNIQUE FOR DIGITALLY REMOVING X-RAY SCATTER IN A RADIOGRAPH USING A MODULATING GRID filed on May 25, 2004, the entire disclosure of which is incorporated herein by reference for all purposes.

BACKGROUND OF THE INVENTION

The present invention relates to techniques for improving radiograph images.

Since the discovery of x-rays and the early days of radiography (i.e., the exposure of x-ray shadowgrams on film), scatter has been recognized as a major contributing factor to image quality degradation. Scatter is the reemission of x-rays (called secondary rays) caused by the absorption of primary rays as illustrated in FIG. 1A. When the reemission of a secondary ray is in a different direction than the direction of the absorbed primary ray, the secondary ray blurs the shadowgram of the object.

Without scatter, the shadowgram sharpness is determined by the size of the x-ray source (called the focal spot), and the distances between the source, the object, and the image. Suitable detectors (e.g., films, intensifying screens, storage-phosphor plates, or solid-state detectors) are placed in the image plane to capture the shadowgram. When scatter is present, the shadowgram sharpness is reduced regardless of the resolution of the detector. Scatter is more pronounced in low-Z materials (such as soft tissue) than in high-Z materials (such as bone). Scatter is also more pronounced when a large x-ray cone beam is used rather than a small one. This is why radiographs of extremities (e.g., hands and legs) are much sharper than radiographs of the pelvis (i.e., a large area with significant amount of soft tissue).

A number of techniques have been suggested to suppress (or at least reduce) x-ray scatter. Some complex techniques involve sweeping a pencil beam or a fan beam of x-rays along with a secondary collimator (to block scatter). A simpler and commonly used technique invented by Gustave Bucky in 1913 involves using a cone beam of x-rays and placing a collimating grid 102 between the object (patient 104) and the detector 106 as shown in FIG. 1B. The purpose of the collimating grid is to absorb secondary rays and transmit primary rays.

Unfortunately, the collimating grid also absorbs a significant percentage of primary rays, and therefore the dose to the patient has to be increased accordingly so as to maintain the correct exposure level on the detector. The dose increase varies with the construction of the grid and its efficiency at reducing scatter, i.e., the greater the scatter reduction, the greater the dose increase. A "grid ratio" of 8:1 to 16:1 is not uncommon. This translates into a dose increase to the patient (i.e., the Bucky factor) of 4 to 6 times the dose necessary when no grid is used. In reality, not using a grid for certain exams (e.g., the pelvis) is not even an option since unblocked scatter would degrade the image quality below any acceptable level.

In view of the foregoing, it is clear that techniques for reducing the scatter in a radiograph are desirable.

SUMMARY OF THE INVENTION

According to the present invention, methods and apparatus are provided for generating an x-ray image corresponding to an object. According to a specific embodiment, the object is interposed between a detector and an x-ray source. A grid is interposed between the x-ray source and the object. The grid includes a plurality of elements defining interstices. A first area of the grid corresponding to the elements is larger than a second area of the grid corresponding to the interstices. The grid is exposed to primary x-ray energy generated by the x-ray source, thereby exposing the object to a first portion of the primary x-ray energy via the interstices of the grid. A second portion of the primary x-ray energy is received with first areas of the detector corresponding to the interstices of the grid. Secondary x-ray energy is received with the first areas of the detector and with second areas of the detector corresponding to the elements of the grid. The secondary x-ray energy results from interaction of the first portion of the primary x-ray energy with the object. X-ray image data are generated for the object by altering first data corresponding to the first areas of the detector with reference to second data corresponding to the second areas of the detector.

According to another specific embodiment of the invention, an apparatus operable to capture an x-ray image corresponding to an object is provided. An x-ray source is operable to generate primary x-ray energy. A detector apparatus is provided for holding a detector operable to capture the x-ray image at an image plane. A grid comprising a plurality of elements defining interstices is provided. A first area of the grid corresponding to the elements is larger than a second area of the grid corresponding to the interstices. The grid is positioned between the x-ray source and the detector apparatus such that the x-ray apparatus is operable to receive the object between the grid and the detector apparatus. The grid is operable to transmit a first portion of the primary x-ray energy via the interstices.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 1:
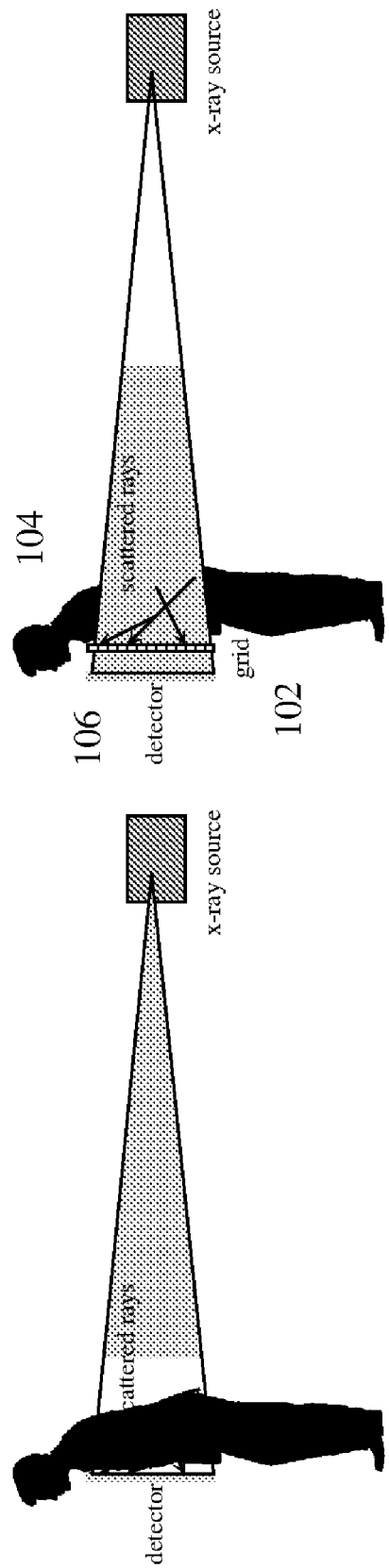
FIG. 1A illustrates a conventional x-ray imaging technique.
FIG. 1B illustrates a conventional x-ray imaging technique which employs a collimating grid.
Figure 2:
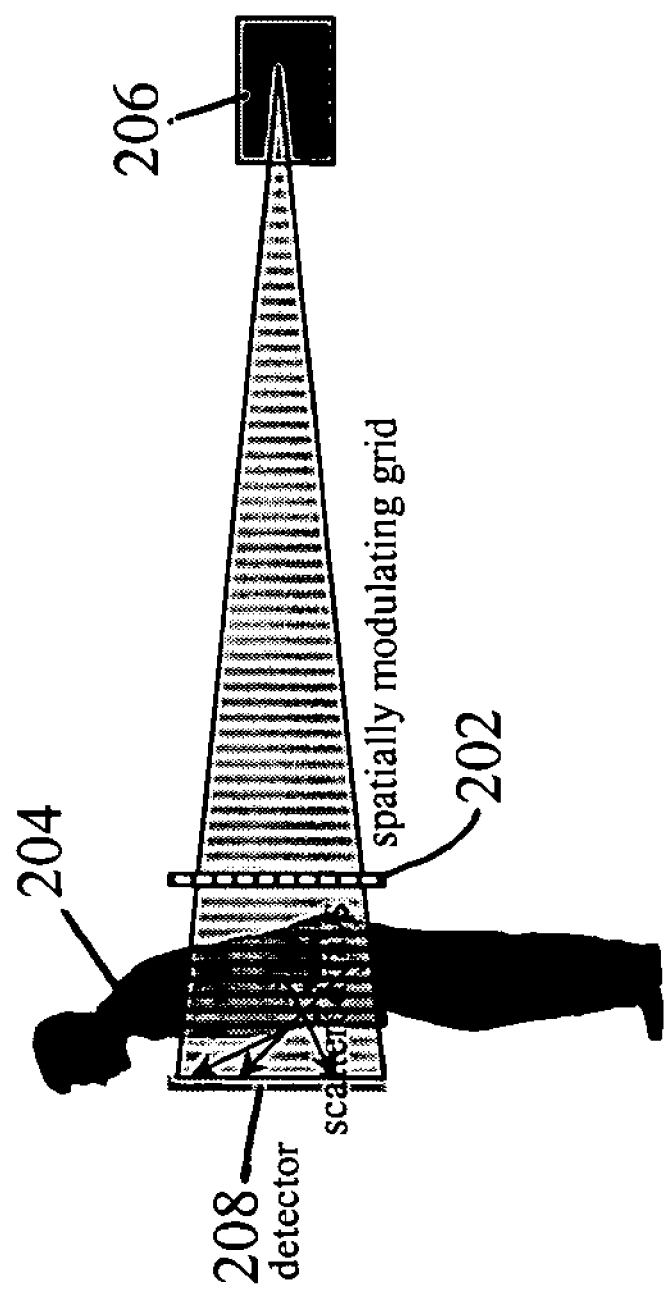
FIG. 2 illustrates an x-ray imaging technique according to a specific embodiment of the invention.
Figure 3:
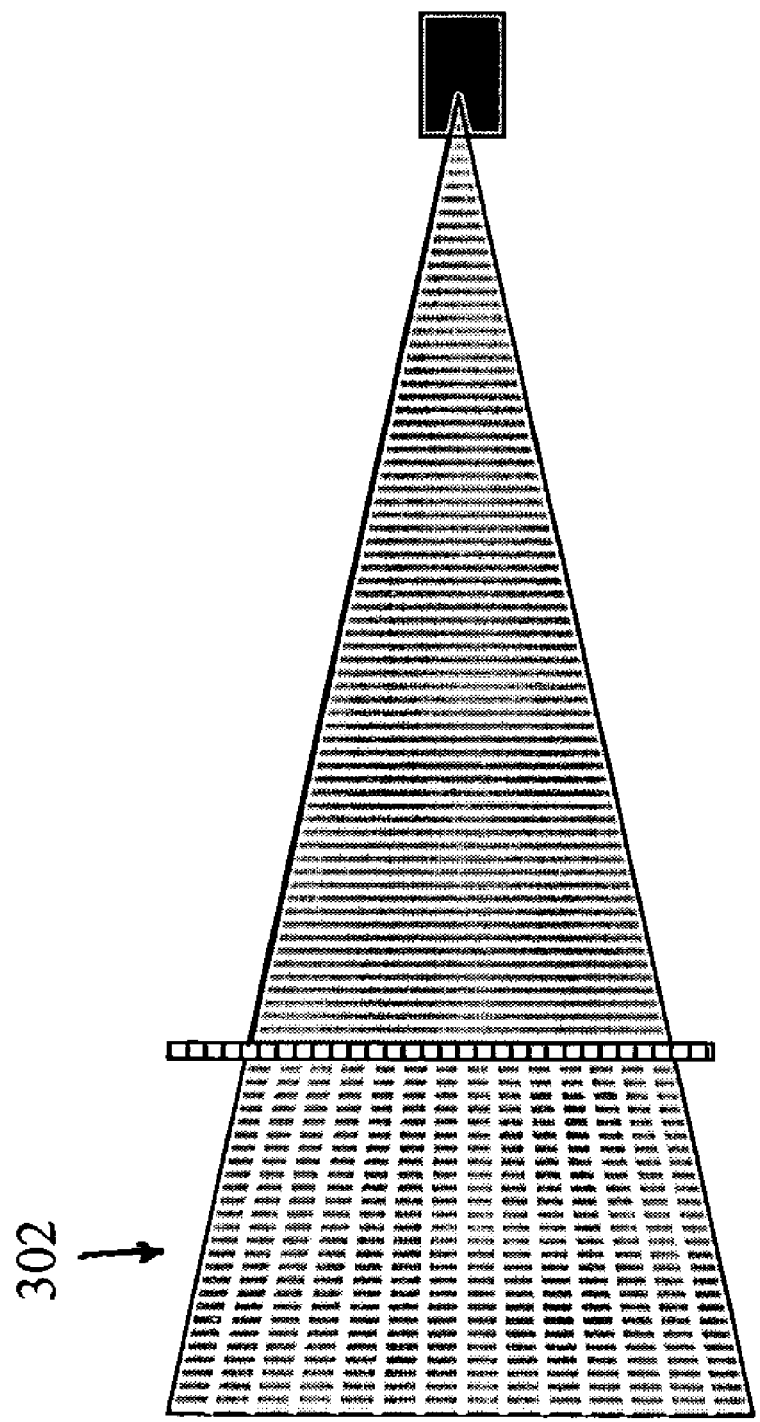
FIG. 3 illustrates operation of a spatially modulating grid according to a specific embodiment of the invention.

As described above, a conventional collimating grid is placed between the patient and the detector so as to absorb secondary rays and transmit primary rays. Following a counterintuitive notion, the present invention instead places a grid 202 between the object (e.g., patient 204) and the x-ray source 206 as shown in FIG. 2. At first, it may seem that the grid would not be effective since it would not stop secondary rays from reaching the detector. In fact, the purpose of the grid in the present invention is no longer to absorb secondary rays and transmit primary rays, but rather to create a spatially modulated x-ray exposure on the detector 208. That is, the grid of the present invention is not a collimating grid but a spatially modulating grid, which creates a lattice of x-ray pencil beams over the patient (e.g., a checkerboard pattern 302 as shown in FIG. 3).

Figure 4:
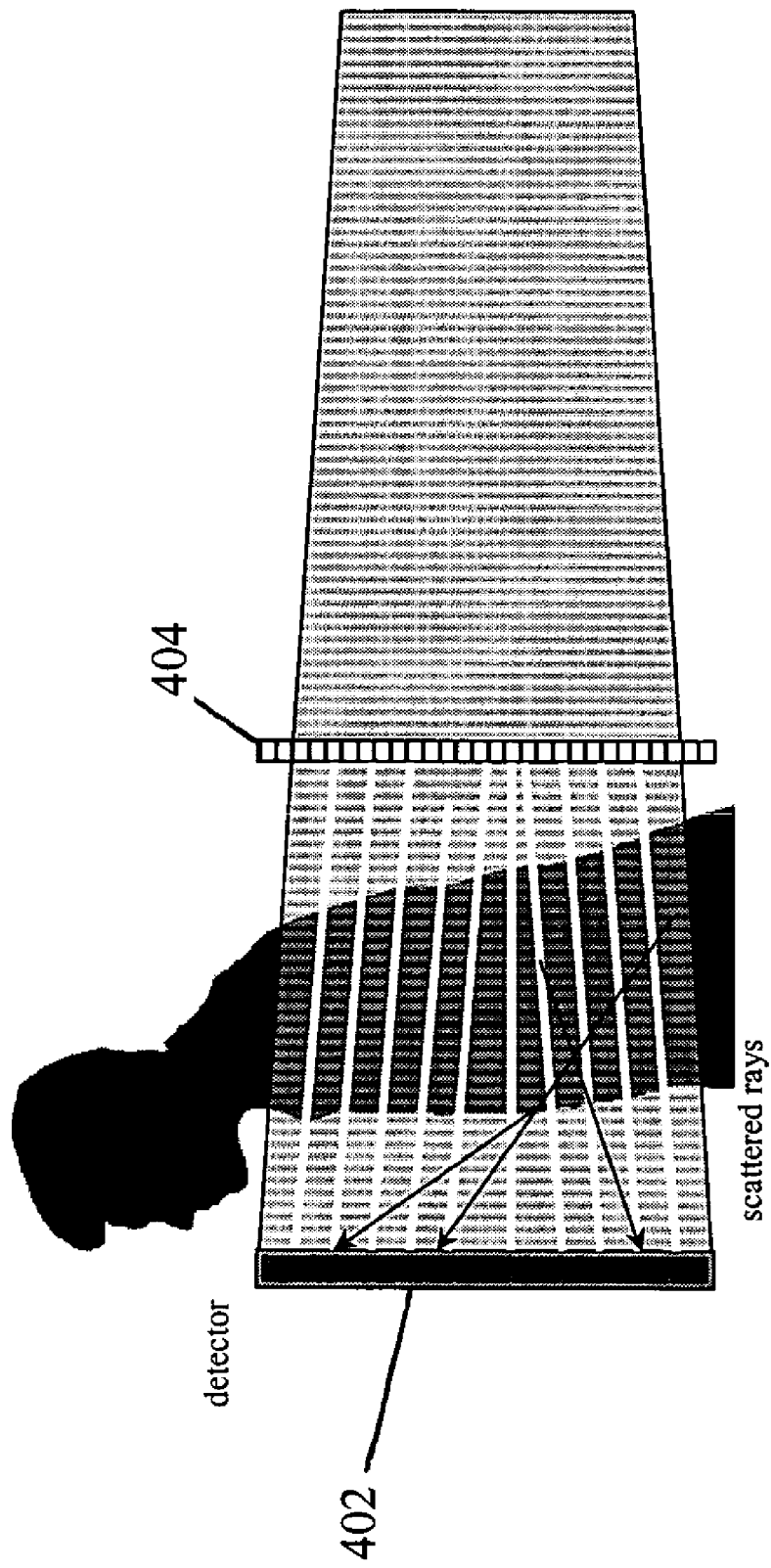
FIG. 4 illustrates capturing of an x-ray image according to a specific embodiment of the invention.

If no scatter is present, only the lattice of (primary x-ray) pencil beams reaches the detector and the gaps between the beams are not exposed. When scatter is present as shown in FIG. 4, some areas of the detector 402 are exposed to primary and secondary x-rays (i.e., where the lattice of pencil beams hit the detector), whereas some areas of the detector 402 are only exposed to secondary x-rays (i.e., the gaps between the pencil beams).

As shown, the spatially modulating grid 404 does not stop scatter radiation from reaching the detector. Rather, according to the present invention, the presence of the spatially modulating grid makes it possible to digitally remove the scatter from the radiograph. This is possible because the presence of the spatially modulating grid results in the capture of two interlaced sub-images within a single radiograph.

One of the interlaced sub-images (created where the x-ray pencil beams hit the detector) is referred to herein as the "shadow+scatter" image. This image is similar to a radiograph taken with a conventional cone beam x-ray source without a collimating grid (i.e., both primary and secondary rays reach the detector). The other interlaced sub-image (created in the gaps between x-rays pencil beams where primary rays are prevented from reaching the detector by the grid) is referred to herein as the "scatter only" image since only secondary rays reach the detector. These interlaced sub-images can be extracted and subsequently processed provided the detector has sufficient spatial resolution. Although it is not clear from the figures, it should be noted that, in some cases, scatter received by a specific area of the detector may be significant as compared to the desired image or shadow information corresponding that area (e.g., up to 3 times).

If the pitch of the lattice of x-rays pencil beams (called p) is small (e.g., 100 µm to 300 µm) the "scatter only" image is a very close approximation of the scatter contribution in the "shadow+scatter" image, since both images are only offset by p/2. Because of this close approximation, it is then possible to remove scatter from the radiograph by digitally subtracting the "scatter only" image from the "shadow+scatter" image.

According to a specific embodiment, the digital image subtraction is performed by subtracting each pixel of the "scatter only" image from the corresponding pixel of the "shadow+scatter" image. Digital image subtraction is a common feature of most image processing software programs (such as ImagePro from Media Cybernetics) and is also referred to as image background subtraction.

For accurate scatter removal, adequate sampling of the scatter image is important. Previous attempts have been made to remove scatter but such methods have not provided for sufficient sampling of the scatter image (as compared to the final image). When the scatter image is strongly undersampled compared to the final image, scatter removal is not accurate and the resulting image is not diagnostically acceptable.

Therefore, according to specific embodiments of the invention, the number of samples for the "scatter only" image is actually higher (in some cases significantly higher) than for the "shadow+scatter" image. This may be understood with reference to grid configurations in which each interstice of the grid is surrounded by an absorbing region, i.e., small transmitting regions (i.e., the interstices) surrounded by large absorbing regions (i.e., the elements of the grid). According to a specific embodiment, the fill factor of the grid is around 16% (i.e., 16% of the grid is transmitting while 84% is absorbing).

Figure 5:
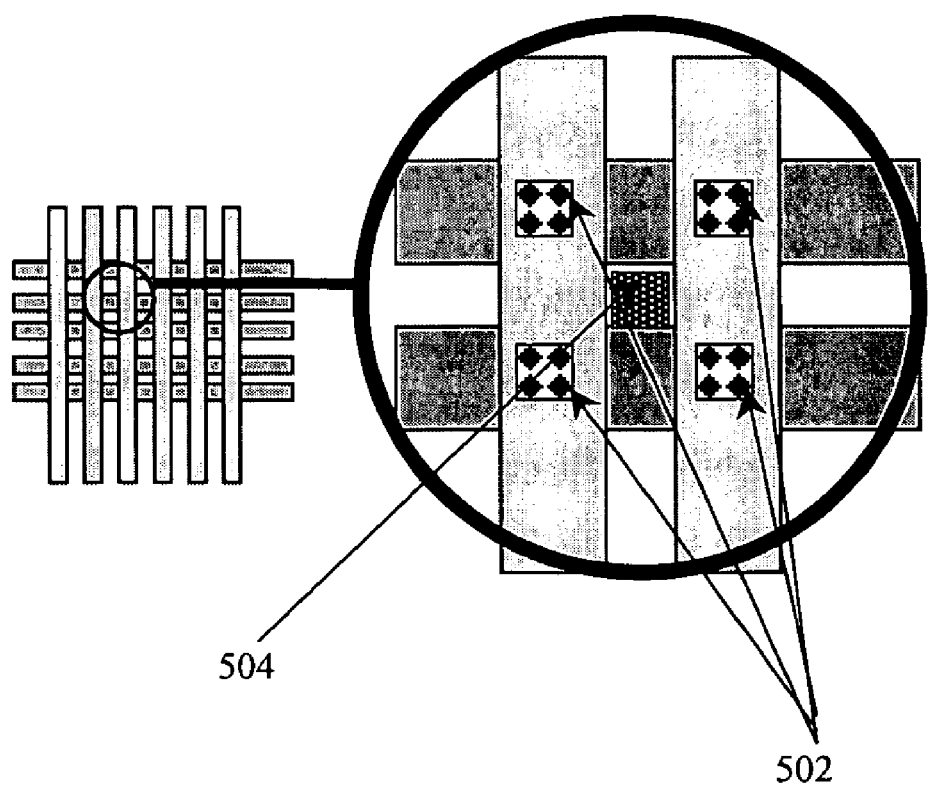
FIG. 5 illustrates an intrapolation technique employed with a specific embodiment of the invention.

Previous techniques in which the scatter image is undersampled compared to the final image have relied on a 2D interpolation to create a complete scatter image. By contrast, according to specific embodiments of the invention, the "scatter only" image is computed using a 2D intrapolation (as opposed to interpolation). More specifically, the scatter value for a given shadow+scatter pixel (corresponding to a particular interstice) is computed by averaging the surrounding pixels (corresponding to the absorbing area of the grid). In a particular embodiment, four pixels corresponding to a particular shadow+scatter pixel are used for this intrapolation. In this embodiment (illustrated in FIG. 5), four "scatter only" pixels 502 surrounding "shadow+scatter" pixel 504 correspond to areas of the grid with maximum absorption (i.e., the overlap regions of vertical and horizontal wires).

Even if the x-ray detector does not have sufficient spatial resolution to perfectly resolve the "scatter only" image from the "shadow+scatter" image, i.e., there is some crosstalk between the two images, sufficient information can still be extracted to perform the scatter removal. Crosstalk between pixels in the x-ray detector is equivalent to adding "scatter only" signal to the "shadow+scatter" image and adding "shadow+scatter" signal to the "scatter only" image. Proper calibration can alleviate this issue. Additionally, image processing software that can analyze image frequency content (e.g., using Fast Fourier Transforms (FFT) algorithms) can be useful in extracting the "shadow+scatter" image and the "scatter only" image from the raw image.

As will be understood by those of skill in the art, the foregoing digital processing may be performed by a wide variety of computing platforms, an example of which is described below with reference to FIG. 9.

It should be understood that even though this technique requires a digital operation, the acquisition of the radiograph itself does not have to be done digitally. That is, a conventional x-ray detector can be used and the captured image subsequently digitized for the digital subtraction of the "scatter only" image. Thus, although a digital detector may be more appropriate for some applications, other detectors (e.g., conventional film, storage-phosphor, etc.) may be employed with embodiments of the invention as long as they have sufficient spatial resolution to over-sample the image plane and capture both interlaced sub-images. As will be understood, any suitable technique for digitizing radiograph images may be employed.

According to some implementations of the present invention, the detector has twice the linear resolution (i.e., four times the number of pixels) than the resolution of the scatter-corrected image. This implies that the shadow of the spatially modulating grid be perfectly registered with the pixel lattice on the detector. Because it is practically difficult to achieve such registration, specific embodiments of the invention employ detectors having a significantly greater resolution than the resolution of the scatter-corrected image. According to one embodiment, the detector has four times the linear resolution of the scatter-corrected image (i.e., sixteen times the number of pixels).

For example, in order to obtain a scatter-corrected pelvis radiograph at 2.8 lp/mm (176 μm pixel), a suitable detector would feature a 44 μm pixel. Most conventional digital detectors are limited to a minimum pixel size of 100 μm (commonly 127 μm or 143 μm) because of fundamental manufacturing process limitation (micro-lithography on glass). Such detectors are therefore inadequate for implementing this scatter-removal technique.

By contrast, new generations of digital detectors based on a novel technique for stimulating and reading storage-phosphor plates are capable of achieving a 44 μm pixel geometry and are therefore ideal for implementing the scatter-removal technique of the present invention. A detailed description of this technique is provided in U.S. Pat. No. 6,800,870, issued Oct. 5, 2004, the entire disclosure of which is incorporated herein by reference for all purposes.

An important benefit of this technique is the fact that use of the spatially modulating grid, unlike the traditional collimating grid, eliminates the requirement for any dose exposure increase to the patient. The detector captures all the remnant rays through the patient (primary as well as secondary rays). The spatially modulating grid does absorb a significant portion of the incoming x-rays, but since it is placed between the source and the patient, it does not necessitate a dose increase to the patient.

And because the purpose of the grid of the present invention is to spatially modulate the x-ray exposure (as opposed to collimating the x-rays), the construction of the spatially modulating grid can be very different than collimating grids. Whereas a collimating grid must stop x-rays at a certain incidence and transmit others at a different incidence, the spatially modulating grid is configured to create a lattice of x-ray pencil beams regardless of the angle of incidence of the incoming x-ray cone beam. According to one embodiment of the invention, in order to minimize the effect of the angle of incident x-rays onto the spatially modulating grid, the grid is made of a crisscross web of high-Z wires having circular cross-sections. Unlike the rectangular cross-section elements used in collimating grids, circular cross-section elements cast the same shadow regardless of the angle of incident x-rays.

Figure 6:
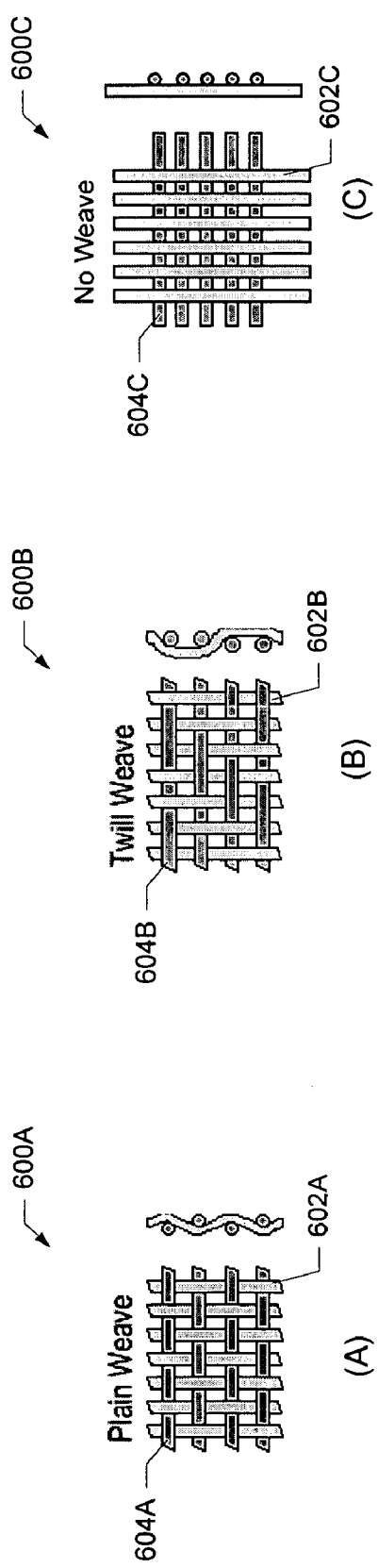
FIGS. 6A-C illustrate exemplary configurations of a spatially modulating grid according to specific embodiments of the invention.

Another effect of the angle of incident x-rays, α, onto the grid is the apparent spacing of the elements. That is, as the angle of incidence increases the apparent spacing decreases. According to a specific embodiment, a 114 μm circular cross-section Tungsten wire is used to build the grid. The grid 600 (of FIGS. 6A-C) is made of two substantially parallel sets of wires placed perpendicular to each other. As shown in FIGS. 6A-C, various implementations of the grid may be constructed with or without a weave, e.g., the plain or twill weaves of FIGS. 6A and 6B, or the "no weave" configuration of FIG. 6C.

Each set of wires covers an approximately 17" by 17" area and contains approximately 2,700 17" long sections of wire (602 or 604) laid next to each other with an inter-space of 46 μm. A 46 μm inter-space provides a 160 μm wire pitch, which results in a 176 μm pitch once projected on the detector with a 110% magnification. The magnification is caused by the relative distances between the source, the grid and the detector.

Figure 7:
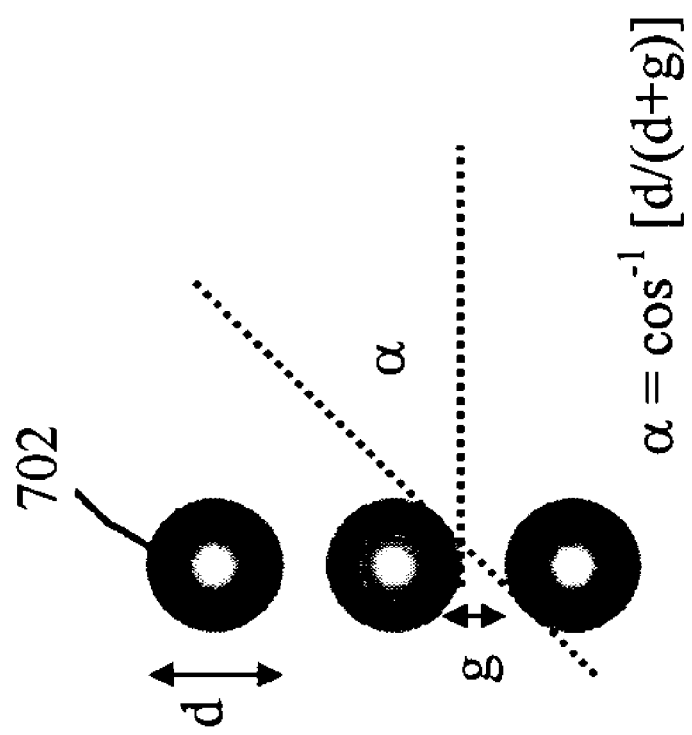
FIG. 7 illustrates transmission of x-rays through interstices of a grid.

At normal incidence, each pencil beam projects an unobstructed spot of approximately 50 μm×50 μm on the detector. The actual spot is larger since the edge of the wires do not absorb nearly as much as the center of the wires. For angles of close to normal incidence, the pencil beam pattern does not change significantly. This means that the angle of the grid with respect to the source is not nearly as critical as with a collimating grid where cutoff can occur. As illustrated by FIG. 7 (which shows horizontal grid wires 702 in cross-section), it would take a 25° angle of incidence, α, to reduce the unobstructed spot to zero.

The x-ray throughput of the specific implementation of the spatially modulating grid described above is given by its fill factor: $(46/114)^2 = 16\%$. This means that 6 times more incident x-rays are required to produce the same exposure as without the grid. This value is similar to the Bucky factor of a conventional collimating grid. Therefore, conventional x-ray generators can be used with this technique without requiring unacceptably long exposure times.

The magnification and focal spot blur effects mentioned above can be minimized by placing the spatially modulating grid as close as possible to the detector (i.e., as far as possible from the source) while still providing enough space for the patient.

In order to obtain a close to ideal "scatter only" image, it is desirable for the gaps between the pencil beam spots to receive the least number of primary x-rays possible. The locations where the primary x-rays are least transmitted by the grid are where the two orthogonal wires cross. At the precise location of the intersection, the x-ray cross-section is twice the diameter of the wire. So, for example, in the case of a 114 μm wire, the maximum x-ray cross-section is 228 μm. Alternatively, in the case of a 150 μm wire, the maximum x-ray cross-section would be 300 μm.

Figure 8:
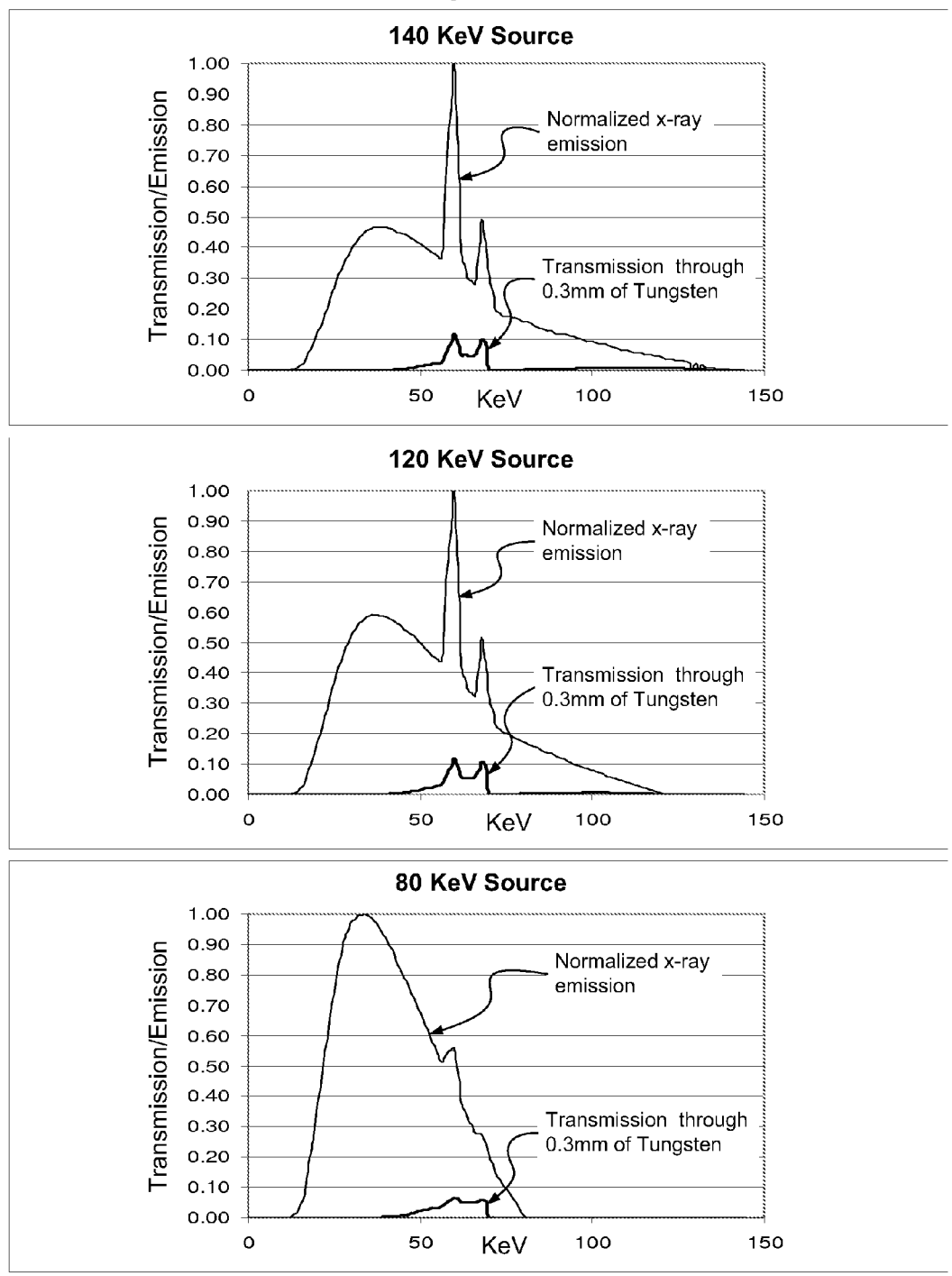
FIG. 8 illustrates transmission of x-rays through Tungsten for different beam energies.

FIG. 8 shows the transmission through 300 μm of Tungsten for different beam energies (140 kVp, 120 kVp and 80 kVp). Even though some primary x-rays do get transmitted through the 300 μm of Tungsten, they do not contribute significantly to the image since their energy is mostly between 60 keV and 70 keV, a range in which, for example, a storage phosphor detector is not very sensitive.

Figure 9A:
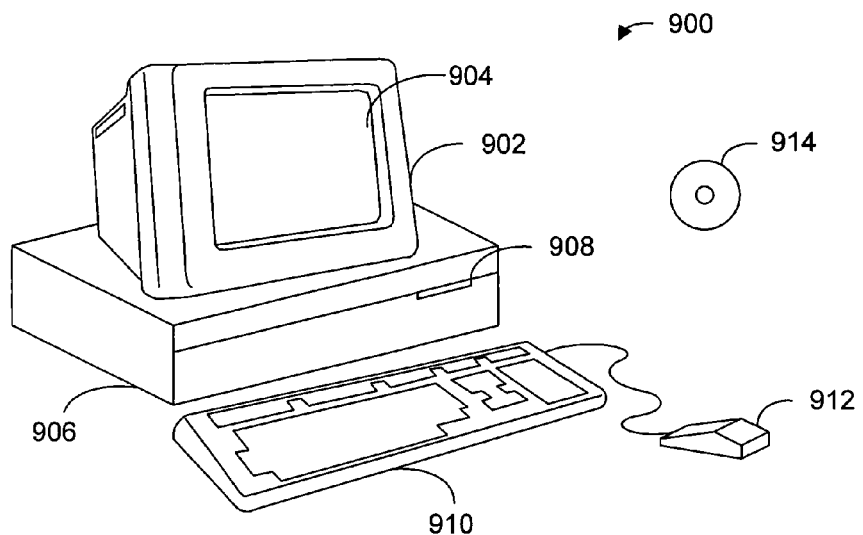
FIGS. 9A and 9B illustrate an exemplary data processing system suitable for use with various embodiments of the present invention.
Figure 9B:
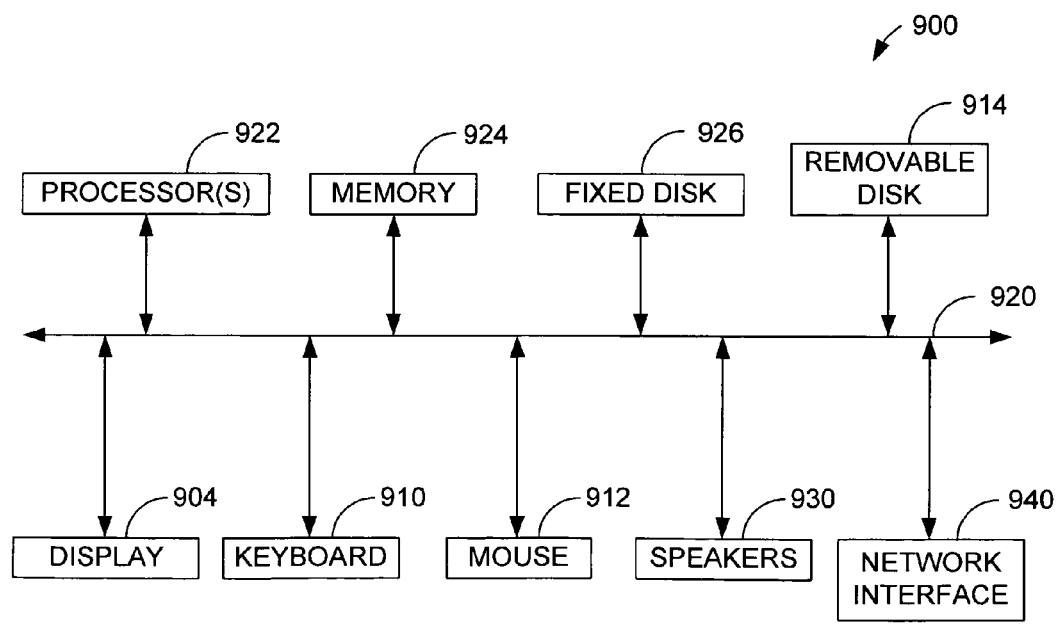

As mentioned above, a wide variety of computing platforms or data processing systems may be employed to implement various aspects of the invention, e.g., the processing of image data to remove scatter, the digitization of captured images, etc. FIGS. 9A and 9B illustrate a computer system 900 suitable for implementing embodiments of the present invention. FIG. 9A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is a block diagram of an exemplary architecture for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with one or more remote CPUs that each share a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for generating an x-ray image corresponding to an object, comprising:
    interposing the object between a detector and an x-ray source;
    interposing a grid between the x-ray source and the object, the grid comprising a plurality of elements defining interstices, a first area of the grid corresponding to the elements being larger than a second area of the grid corresponding to the interstices;
    exposing the grid to primary x-ray energy generated by the x-ray source, thereby exposing the object to a first portion of the primary x-ray energy via the interstices of the grid;
    receiving a second portion of the primary x-ray energy with first areas of the detector corresponding to the interstices of the grid;
    receiving secondary x-ray energy with the first areas of the detector and with second areas of the detector corresponding to the elements of the grid, the secondary x-ray energy resulting from interaction of the first portion of the primary x-ray energy with the object; and
    generating x-ray image data for the object by altering first data corresponding to the first areas of the detector with reference to second data corresponding to the second areas of the detector.

2. The method of claim 1 wherein the first portion of the primary x-ray energy comprises a plurality of pencil beams.

3. The method of claim 2 wherein the first and second areas of the detector are defined by the pencil beams.

4. The method of claim 1 wherein the secondary x-ray energy is caused by scattering of the primary x-ray energy by the object.

5. The method of claim 1 further comprising digitizing the second portion of the primary x-ray energy and the secondary x-ray energy to generate the first and second data.

6. The method of claim 1 wherein altering the first data with reference to the second data comprises subtracting the second data from the first data.

7. The method of claim 6 wherein the relationship between the first and second areas of the grid results in the second data being oversampled relative to the first data.

8. The method of claim 6 wherein the second data are derived using a 2D intrapolation technique for the secondary x-ray energy received with the second areas of the detector.

9. An apparatus operable to capture an x-ray image corresponding to an object, comprising:
    an x-ray source operable to generate primary x-ray energy;
    a detector apparatus for holding a detector operable to capture the x-ray image at an image plane; and
    a grid comprising a plurality of elements defining interstices, a first area of the grid corresponding to the elements being larger than a second area of the grid corresponding to the interstices, the grid being positioned between the x-ray source and the detector apparatus such that the x-ray apparatus is operable to receive the object between the grid and the detector apparatus, and wherein the grid is operable to transmit a first portion of the primary x-ray energy via the interstices.

10. The apparatus of claim 9 wherein the elements of the grid comprise a plurality of wires, the plurality of wires comprising first substantially parallel wires aligned in a first direction, and second substantially parallel wires aligned in a second direction perpendicular to the first direction.

11. The apparatus of claim 10 wherein the first wires are interwoven with the second wires.

12. The apparatus of claim 10 wherein the first and second wires reside in separate layers which are not interwoven.

13. The apparatus of claim 10 wherein each of the wires is characterized by a substantially circular cross-section.

14. The apparatus of claim 9 wherein the first portion of the primary x-ray energy comprises a plurality of pencil beams defined by the interstices of the grid.

15. The apparatus of claim 9 further comprising the detector.

16. The apparatus of claim 15 wherein the detector comprises one of film, an intensifying screen, a storage-phosphor plate, and a solid-state detector.

17. The apparatus of claim 9 wherein the detector apparatus is positioned such that when the object and the detector are present, a second portion of the primary x-ray energy is received with first areas of the detector corresponding to the interstices of the grid, and wherein secondary x-ray energy is received with the first areas of the detector and with second areas of the detector corresponding to the elements of the grid, the secondary x-ray energy resulting from interaction of the first portion of the primary x-ray energy with the object.

18. The apparatus of claim 17 further comprising a data processing system operable to generate x-ray image data for the object by altering first data corresponding to the first areas of the detector with reference to second data corresponding to the second areas of the detector.

19. The apparatus of claim 18 wherein the data processing system is further operable to digitize the second portion of the primary x-ray energy and the secondary x-ray energy to generate the first and second data.

20. The apparatus of claim 18 wherein the data processing system if further operable to alter the first data with reference to the second data by subtracting the second data from the first data.

* * * * *